United States Patent [19] [11] 4,233,047
Stultz et al. [45] Nov. 11, 1980

[54] IN SITU REPAIR OF DELAMINATED FLOAT BATH BOTTOM REFRACTORY

[75] Inventors: James C. Stultz; George A. Pecoraro, both of Lower Burrell, Pa.

[73] Assignee: PPG Industries, Inc., Pittsburgh, Pa.

[21] Appl. No.: 35,038

[22] Filed: May 1, 1979

[51] Int. Cl.³ .............................................. C03B 18/16
[52] U.S. Cl. ..................................... 65/27; 65/99 A; 65/172; 65/182.1
[58] Field of Search ................. 65/99 A, 27, 171, 172, 65/182 R

[56] References Cited

U.S. PATENT DOCUMENTS

| 2,178,134 | 10/1939 | Blau et al. | 65/27 |
| 3,930,829 | 1/1976 | Sensi | 65/99 A |
| 4,055,407 | 10/1977 | Heithoff | 65/27 |
| 4,099,952 | 7/1978 | Schwenninger | 65/99 A |

Primary Examiner—Arthur D. Kellogg
Attorney, Agent, or Firm—Dennis G. Millman; Paul A. Leipold

[57] ABSTRACT

A system for in situ repair of the bottom refractory of a chamber holding molten metal is disclosed. The system utilizes a weighted refractory block which is put in place through the molten metal. The repair is suitable for the bottom refractories of a forming chamber for float glass formation.

10 Claims, 8 Drawing Figures

IN SITU REPAIR OF DELAMINATED FLOAT BATH BOTTOM REFRACTORY

BACKGROUND OF THE INVENTION

1. Field of the Invention

This invention generally relates to the forming chamber for the formation of glass on a molten metal. In particular the invention relates to the repair of the bottom refractories of the forming chamber.

2. Discussion of the Prior Art

In processes of float glass formation wherein molten glass is formed into sheets on a pool of molten metal there has been a continuing interest in methods of repair of refractories in the forming chamber. As illustrated in U.S. Pat. No. 3,594,147 to Galey et al the bottom refractories of the forming chamber may be cast in place. In the most common type of bath bottom construction as illustrated by U.S. Pat. No. 3,584,477 to Hainsfurther, the bottom blocks are precast, layed in place and bolted down. The refractory blocks must be held down or they will float upward onto the surface of the metal bath. The tin which ordinarily forms the molten metal of the bath is corrosive to steel and leaks will result if the metal casing of the bath is exposed to continual attack of the molten metal. Further, if the studs holding the refractory blocks are exposed to molten metal they will corrode and the blocks will float to the surface of the bath.

The view of the difficulties that are caused by the failure of bottom refractories in the bath, there is a continuing need for a method for repairing such refractories without the need to shut down and drain the forming chamber. For reasons not entirely understood, there is a tendency for the bottom refractories, particularly in bolted down precast blocks, in the forming chamber to delaminate at a point about 7" from the upper surface of the blocks. The typical refractory bottom block of a forming chamber is about a foot thick. The delamination of the upper portion risks exposure of the hold down bolts or studs, which if they are corroded lead to the entire block floating to the surface and exposing the metal casing of the forming chamber to attack by the tin. Therefore, when delamination occurs it must be repaired within a short time. The normal method of repair prior to the instant invention was to shut down the forming chamber, drain the metal from the bath, and reset or recast a new block or blocks where delamination has occurred. This, of course, is very expensive as extensive delays in production are caused. Also, it has been known in the glass industry that baths were not repaired but continued to run after the bottom had deteriorated such that a release of tin through the bottom occurred. Also, operation with exposed bottom steel can cause glass bubble defects. Therefore, there is a need for a reliable method of in situ, hot repair of the bottom refractories in a float forming chamber. There is a need for a repair that may be done through the molten metal without draining the forming chamber.

SUMMARY OF THE INVENTION

It is an object of this invention to overcome the disadvantages of prior processes and apparatus.

It is another object of this invention to allow hot repair of forming chamber bottom refractories.

It is an additional object of this invention to lower the cost of repair of the refractories in the bottom of the forming chamber.

It is again a further object of this invention to prevent leaks from forming chambers caused by refractory failure.

It is again a further object of this invention to prevent glass defects caused by defects in the bottom refractories of a forming chamber.

It is an additional object of this invention to allow longer term operation of a forming chamber.

These and other objects of the invention are generally accomplished by providing weighted refractory blocks which may be filled into the hole created by delamination of a portion of the refractory bottom of a forming chamber.

In a best mode of the invention a high alumina refractory is drilled to create a series of interconnecting holes forming a hollow core. The hollow core is then filled with tungsten rods so as to create a density of the block that is greater than the density of tin. This block will sink and may be pushed into the hole formed by delamination. The block when it is in the hole creates a dead spot beneath it which protects the underlying refractory from further deterioration by erosion, lowers the temperature thereby minimizing corrosion and prevents the washing out of loose refractory particles which protect the metal bolts. In another aspect of the preferred mode, the original block is drilled from the bottom to insert pins to hold it in place.

DETAILED DESCRIPTION OF THE INVENTION

The repair system of the invention has numerous advantages over prior processes which required the cold repair of the forming chamber. By repairing the forming chamber while hot, production for only several hours is lost. Further, the repair may be accomplished quickly thereby minimizing damage to exposed refractories or metal after delamination occurs. Another advantage is that glass defects caused by erosion of refractory material or corrosion of metal hold down devices are minimized. There is a savings in energy and other costs in prolonging the life of the forming chamber by an easy repair method for delaminated bottom blocks.

Figure 1:
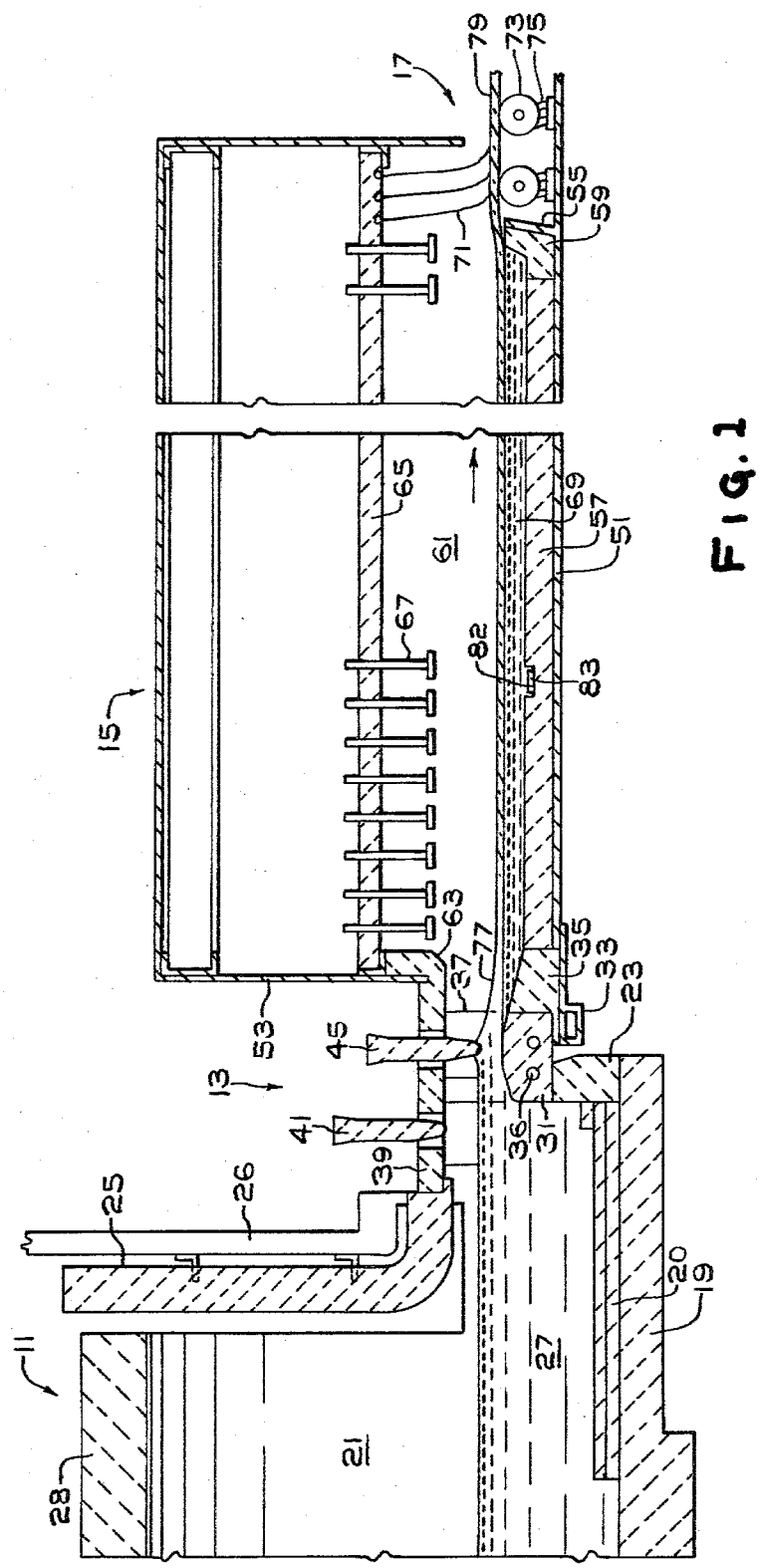
FIG. 1 is a sectional elevation view of an apparatus for producing flat glass.
Figure 2:
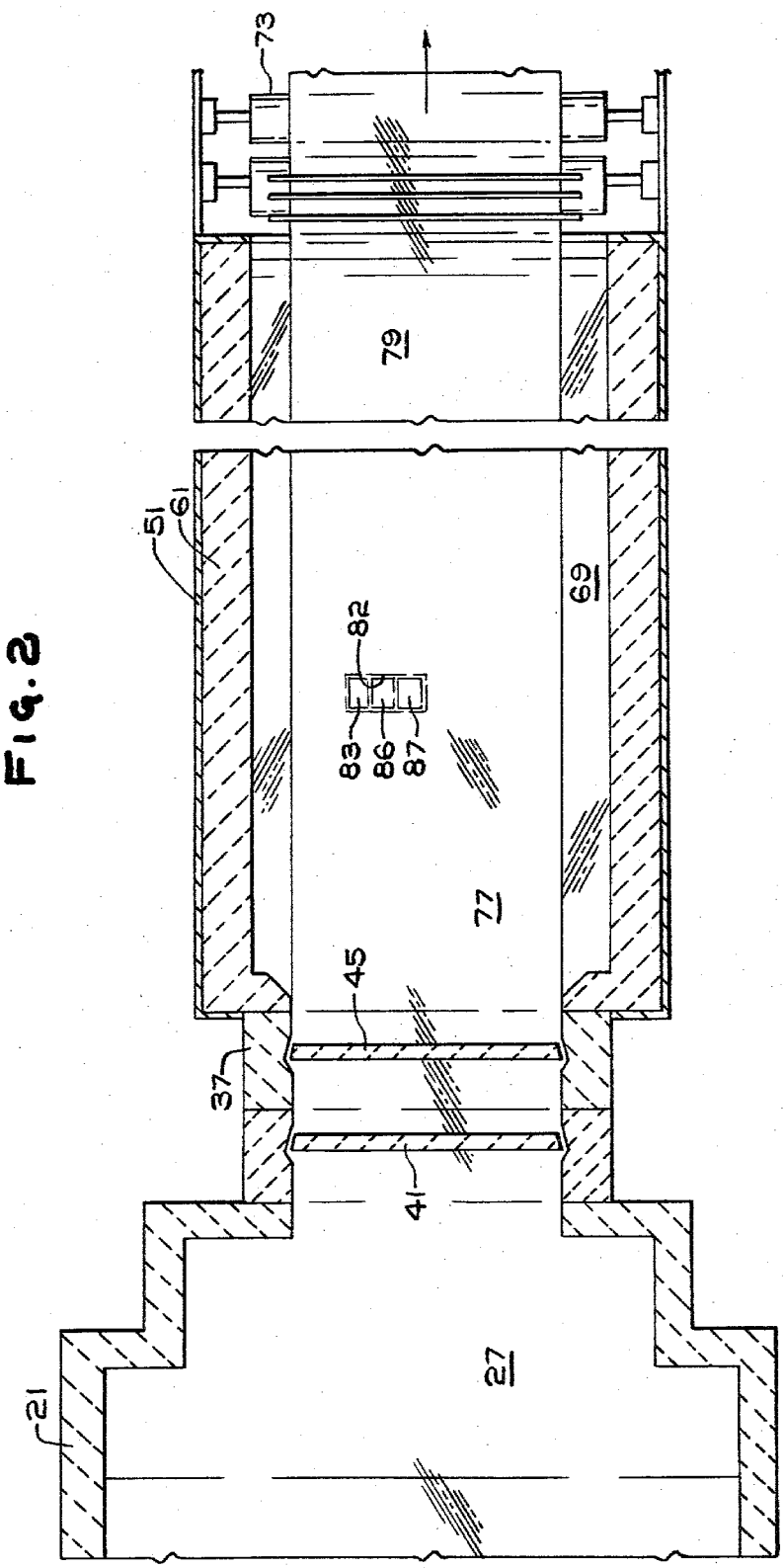
FIG. 2 is a sectional plan view of the apparatus for producing flat glass shown in FIG. 1.

Referring now to FIGS. 1 and 2 there is shown a view of a suitable apparatus for carrying out the present invention. The glassmaking apparatus comprises a furnace 11, delivery means 13, a forming chamber 15 and a glass removal facility 17. It will be understood that the lifting and conveying apparatus employed in the practice of this invention may be designed to cause the glass to be conveyed along either a horizontally extending path as shown or along an upwardly extending path.

The glassmaking furnace 11 includes a melting section (not shown) and a refiner or conditioner, the end of which is shown. The refining or conditioning section of the furnace 11 comprises a furnace bottom 19 preferably with a raised section 20, side walls 21 and a front basin wall 23. The furnace further comprises an upper front wall 25 which preferably is suspended or supported from above by a structural support 26 and a roof 28 overlying the upper portion of the furnace. A pool of molten glass 27 is maintained in the furnace.

The delivery means 13 includes a threshold 31 resting on a cooling block 33 or other support. A cast refractory seal 35 or the like is disposed between the threshold 31 and the cooling block 33. Extending through the holes in the threshold are conduits or pipes 36 for transporting coolant or the like through the interior of the threshold 31 and for controlling its temperature during use. At the ends of the threshold 31 there are side wall portions or jambs 37 on the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown) extending above it and connected to flat arch supporter embedded in the flat arch itself. Extending transversely across the delivery means 13 are two gates or tweels. The first tweel is a backup tweel 41 connected to a support assembly (not shown) for raising or lowering it into engagement in the pool of molten glass 27. The second tweel is a control tweel 45 supported by support assembly (not shown) for raising and lowering the tweel. The tweel is held in operating position in contact with the molten glass to be delivered for forming. The control tweel 45, along with the threshold 31 and the jambs 37, define an opening through which a layer of molten glass may be delivered for forming.

The forming chamber 15 comprises a bottom casing 51. This casing is preferably a casing constructed of metal, such as steel. The casing is preferably impervious to the molten metal in the chamber. The forming chamber 15 further comprises a top casing 53 including a top, ends and side portions. The top casing is also preferably constructed of impervious metal. An end piece or lip casing 55 is disposed across the forming chamber at its downstream end and, connected to the bottom casing 51. Disposed within the bottom casing 51 is a refractory bottom 57, preferably a refractory bottom that has been layed in place from preformed block inside the bottom casing 51 between the inlet bottom 35 and an exit lip 59 mounted or cast against the lip casing 55. The refractories are bolted down after being layed.

The forming chamber 15 further comprises refractory side walls 61. These, along with the bottom refractory 57, the threshold 31 and the exit lip 59, define a container for holding a pool of molten metal.

The upper portion of the chamber further includes a lintel 63 at its upstream end. This lintel 63 may be used as a means for supporting delivery means roof 39. Additionally, the upper portion of the chamber includes a ceiling or roof 65 preferably constructed of refractory material suitable for radiating or absorbing heat uniformly over the area facing the glass beneath it during operation. Extending through the ceiling of the forming chamber are controllable heating elements 67 used to control the rate of heat removal from the glass during forming. These heating elements are connected to bus bars (not shown) which are connected, in turn, to a source of power (not shown). The upper portion of the forming chamber 15 includes a top casing end wall which may extend over the glass removal or withdrawal facility 17 at the downstream end of the forming chamber 15. Alternatively, a separate hood may be provided over the glass removal facility 17. Disposed within the bottom container portion of the forming chamber is a pool of molten metal 69, preferably molten tin or an alloy of tin.

At the downstream end of the forming chamber is the glass removal facility 17 for withdrawing a continuous sheet of glass from the forming chamber 15. The glass removal facility includes curtains 71 or other barriers or seals to segregate the headspace of the forming chamber from the outside environment. These are preferably flexible curtains of heat resistant cloth. The glass removal facility further includes liftoff rolls 73 mounted in a position to lift and convey a glass sheet from the forming chamber. These rolls 73 are provided with seals 75, usually of graphite, to seal the bottom portion of the forming chamber from the outside environment.

When making flat glass using the apparatus described, a layer of molten glass 77 is delivered onto the molten metal 69 in the upstream end of the forming chamber. This glass is cooled and forces are imparted to the glass, for example, by the action of rolls 73. This causes the glass to advance along the surface of the pool of molten metal and to form a continuous sheet of glass that is dimensionally stable (that is, it assumes a stable thickness and width that is maintained as the glass is withdrawn from the forming chamber). The applicant recognizes that the term "bath" has at times been used in the art to mean the pool of molten metal upon which the glass is formed and at other times to mean the forming chamber where the glass sheet formation takes place on the molten metal bath. However, in this specification, the applicant intends to refer to the structure as the forming chamber and only use the term "bath" to refer to the pool of molten metal. The terms "ribbon" and "sheet" are used interchangeably to refer to the strip of glass formed on the bath in the forming chamber. The directions "upstream" and "downstream" are defined by the direction of glass flow through the process; that is, glass flows from an upstream portion of the glassmaking apparatus toward a downstream portion of the glassmaking apparatus. Further, while the invention is illustrated with glass delivery to a forming chamber along a generally level flow it is also suitable for use in the process where glass is delivered by free fall to the forming chamber.

In the bottom of forming chamber 15 is illustrated a delaminated cavity or hole portion 82 in which are resting repair blocks 83, 84, and 85. The description of the delaminated portion and the repair blocks is illustrated by reference to FIGS. 3 through 8 and the discussion below.

Figure 3:
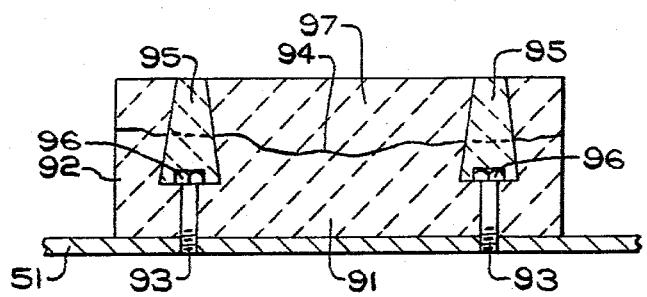
FIG. 3 is a sectional view of a bottom block in a forming chamber illustrating the method of holding down the block and a crack leading to delamination.

As illustrated in FIG. 3 there is a bottom block 92 that has a crack 94 which will lead to delamination of portion 97. These blocks in typical configuration are approximately 2'×3'×1' thick. The delamination point is normally approximately in the middle or 7" from the top. Space 95 which is above hold down bolt 93 is generally filled with a castable fireclay refractory after tightening bolt 96 onto stud 93 which is welded to the bottom casing 51 of the forming chamber. As may be seen in FIG. 4, which is a view of a delaminated block, the delamination exposes portions of the castable refractory 95, which may be eroded by the action of the tin or other molten metal which flows over the block.

Figure 4:
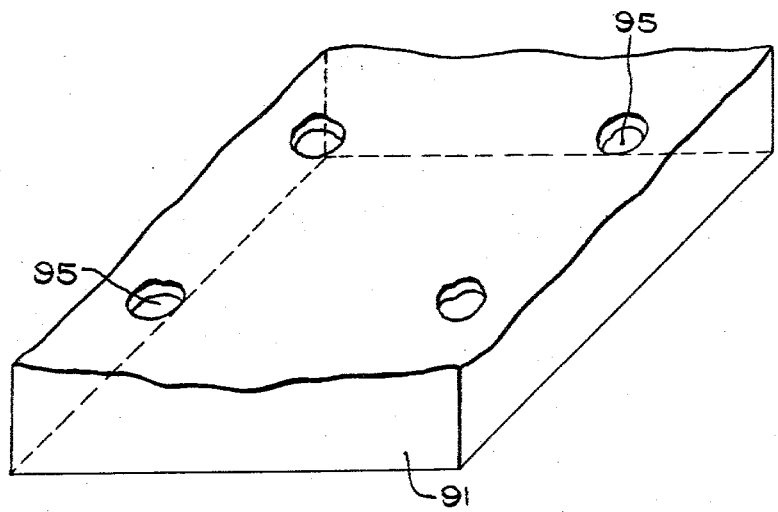
FIG. 4 is a view of delaminated block.
Figure 7:
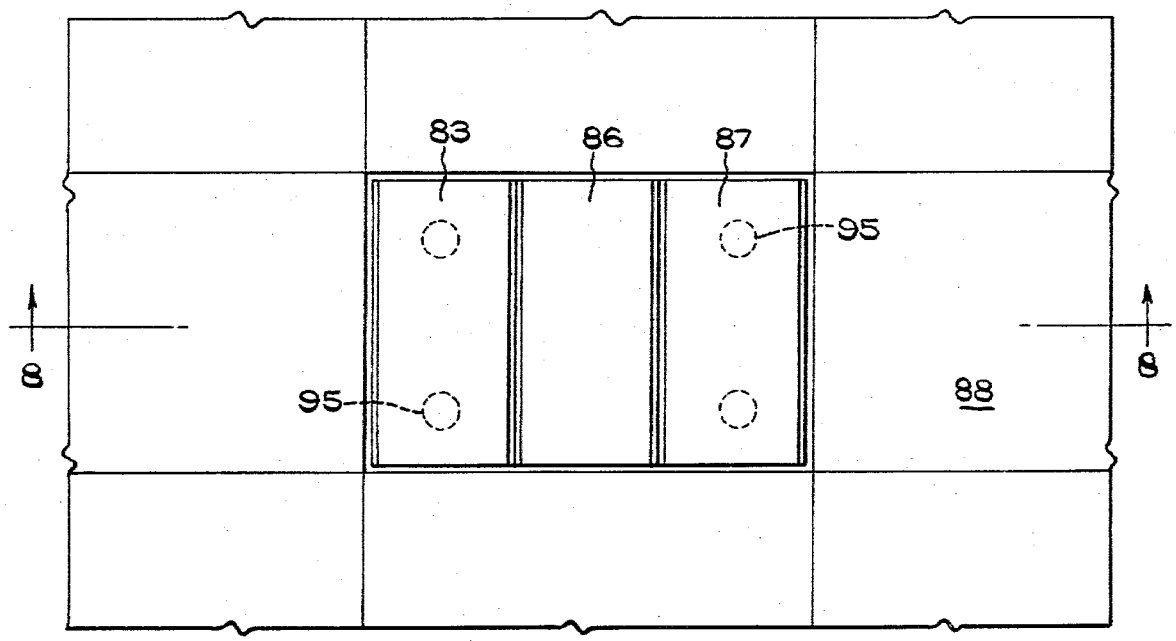
FIG. 7 is a top view of the forming chamber bottom with repair blocks installed.
Figure 8:
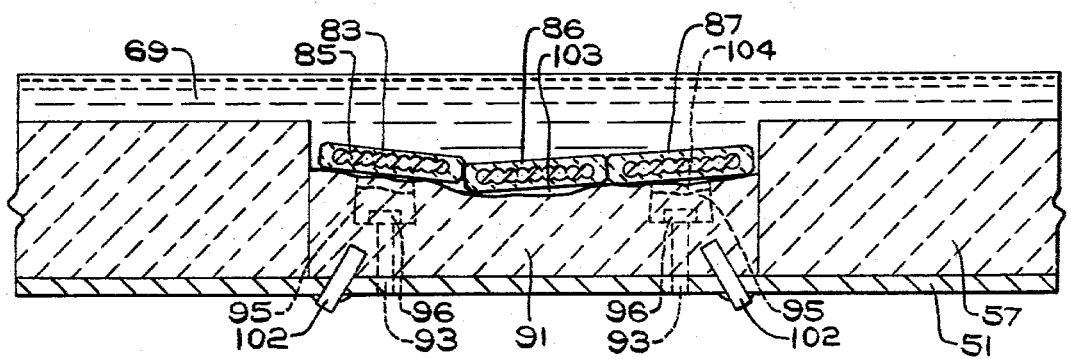
FIG. 8 is a sectional view along line 8—8 of FIG. 7 illustrating the forming chamber bottom with repair blocks installed.

As illustrated in FIGS. 4, 7 and 8 a portion of the repair contemplated by the instant invention is to drill upwards through bottom casing 51 at at least two points beneath the delaminated block, insert at least two metal pins 102 which are welded to the bottom casing 51. These pins prevent the refractory block 91 from floating to the surface of the molten tin in the event the hold down bolts are corroded.

Figure 5:
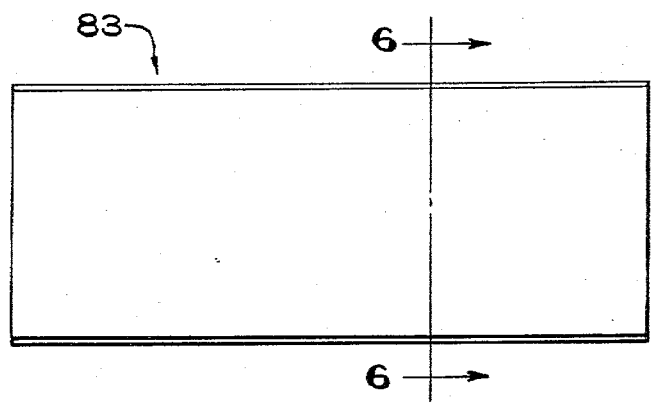
FIG. 5 and FIG. 6 are views of a repair block in accordance with the invention.
Figure 6:
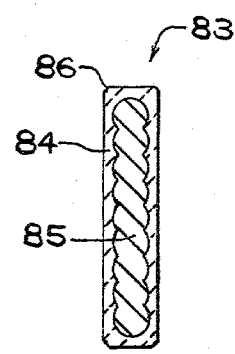

FIGS. 5 and 6 illustrate a repair block fabricated in accordance with the invention. The repair block generally indicated as 53 is formed by drilling overlapping cores from the refractory block to form a center cavity 84. Into this cavity is inserted rod of higher specific gravity than tin in order to weight the refractory sufficiently so that it will sink into the molten bath. In addition the refractory block is generally rounded at its corners, such as 86, in order to create less displacement of tin when the block is put into the forming chamber.

In order to carry out the repair system of the invention after insertion of the hold down pins 102, the flow of glass is stopped by lowering the tweel. It is also possible to carry out a repair near one side of the chamber by diverting the glass flow to one side of the chamber rather than stopping the flow. After the glass is no longer passing over the delaminated portion of the bottom, repair block or blocks are inserted into the forming chamber. As illustrated in FIGS. 7 and 8, three repair blocks such as those illustrated in FIGS. 5 and 6 are utilized. A portion of the side wall of the forming chamber is removed and a block is inserted into the bath. The block will sink. After the block rests on the bottom it is pushed into the hole by hooked or L shaped rods. The weight of the submerged block is generally only about 20 pounds or less. Therefore, pushing it along the bottom is not difficult. In order that an exact fit not be required it is generally preferred to utilize more than one repair block. As illustrated in FIG. 7 three repair blocks 83, 86 and 87 are utilized. The repair blocks are designed such that their thickness is not sufficient to raise the level of the delaminated block to above the level of the surrounding blocks such as 88. As the delamination will be irregular if an exact height to match the previous bottom is attempted a ridge may raise the block above the chamber bottom creating undesirable flow currents.

The repair blocks trap portions of liquid metal such as at 103 and 104. The stagnant portions of molten metal however, are cooler than the general portion of the bath as they are isolated. Further, as they do not circulate with the molten metal of the bath they do not contribute defects to the glass. By being cooler any corrosion of the hold down bolts is slowed and minimized and products of the corrosion are trapped by the repair blocks.

The refractories that are utilized in the repair blocks may be of any material which is not corroded by molten tin and does not release any harmful contaminants for the glass passing through the forming chamber. Preferred are refractories that are high in alumina. An optimum refractory is found to be a mullite bonded refractory of about 94 percent alumina and about 6 percent silica. The refractory may be cast with an inner cavity or a block may be drilled to provide a cavity. The high alumina refractories are preferred as they have good thermal shock resistance, high density, high strength, and have a thermal expansion rate that is a reasonable match for the thermal expansion rate of tungsten, the preferred weight which fills the cavity. Thermal shock characteristics of a refractory are important as the refractory preferably goes from ambient conditions outside the bath to the bath temperature with very little thermal adjustment time.

A preferred weighting material is tungsten in the form of rods as this material is non-reactive in the forming chamber atmosphere and molten metal bath and has a specific gravity of about 19.3 gms/cc at typical forming chamber temperatures. This compares favorably with the approximate 6.8 gms/cc density of molten tin. The tungsten generally is added in sufficient amount to provide a sink weight of about 15 pounds. The sink weight is adjusted such that the refractory may be easily pushed into the hole in the bottom, but that it is not so light that it will be washed out by motion of the molten tin in the forming chamber. While tungsten is the preferred material, other non-reactive metals may be utilized as the weighting material. Among other suitable metals are tungsten alloys, tantalum and molybdenum.

It is generally preferred that the surface of the exposed tungsten rods be coated with a refractory cement to insure that the rods are not dislodged during the installation and use of the repair block.

While the method of holding down the remaining portion of the block 91 has been illustrated as angled pins 102 welded to the bottom of the forming chamber casing 51 the method of holding down the remaining block may be any desired positive gripping means which prevents its floating if the imbedded hold downs are corroded. For instance, tapped screw holes could be formed in the bottom of the refractory or expandable bolts could be inserted into the refractory and expanded. However, the method of insertion of angled rods which are welded to the bottom is simple and effective.

Although this invention has been described with reference to particularly preferred embodiments, those skilled in the art of glass making and refractories will recognize that variations may be made in the practice of the invention without departing from the concepts disclosed. For instance, rather than a weighted refractory, it would be possible to use sheets of tungsten to cover the delaminated portion. Further, it would be possible to form a composite article of tungsten powder and a refractory cement to a higher than molten tin specific gravity. Further, it would be possible to wrap bars of tungsten in a refractory cloth to form bundles which would be placed into the cavity. In another variation of the invention, lead could be encased in a metal such as molydenum and utilized as the repair block. In this instance high quality weldings of the molydenum casing would be necessary as the lead if released into the molten tin of a conventional bath would be harmful.

Accordingly this disclosure intended to be illustrative rather than limiting. For instance, while the specification has stressed the utilization of this process for repair of the bottom refractories of the forming chamber for glass making, the concept could be utilized in other areas where refractory repair through molten metal was desirable. Such repairs are desirable in the furnaces utilized in the refining and forming of metals such as zinc, copper, or tin. It is also within the invention to initially form at least a portion of the bottom of a molten metal container with the weighted block rather than only use them only for repair.

Therefore, while the invention has been described with reference to particularly preferred embodiments thereof, it is considered as defined by the accompanying Claims rather than being limited by these specific embodiments.

We claim:

1. A method of repairing a cavity in the bottom of a glass float forming chamber containing molten metal comprising: limiting the glass flow in the chamber to eliminate glass overlying said cavity, opening an access into the chamber above the level of the molten metal, inserting through said access and into the molten metal a repair block which comprises a material selected from the group consisting of tungsten, molybdenum, tantalum, and alloys and ceramic refractory combinations thereof such that the aggregate repair block has a higher specific gravity than the molten metal in the chamber, the repair block being of a size adapted to fit within the cavity without substantially projecting above the elevation of the chamber bottom, and moving the repair block into the cavity, whereby further growth of the cavity is inhibited.

2. A method of repairing a forming chamber of claim 1, wherein said repair block comprises a refractory block provided with at least one cavity filled with metal.

3. The method of claim 2, wherein said material is tungsten metal in the form of rods.

4. The method of claims 2 or 3 wherein said metal in the repair block is covered by refractory paste at the surface of said block.

5. The method of claim 1, wherein said repair block is a metal plate.

6. The method of claim 2, wherein said moving is with hooked rods.

7. The method of claim 2, wherein the submerged weight of said block is less than about 20 pounds.

8. The method of claim 1 further comprising drilling at least one hole into the refractory block forming the bottom of said cavity and into the bottom casing of the forming chamber below the said refractory block and inserting means to hold said refractory block to said bottom casing into said hole.

9. The method of claim 8, wherein said at least one hole is angled.

10. The method of claim 8, wherein said means to hold said refractory block is a metal pin inserted in the drilled hole and welded to said bottom casing.

* * * * *